United States Patent Office 2,729,642
Patented Jan. 3, 1956

2,729,642

WATER SOLUBLE SALTS OF 8-(PARA-AMINO-BENZYL) CAFFEINE AND METHOD FOR THEIR PREPARATION

Raymond Merritt Burgison, Baltimore, Md., assignor, by mesne assignments, to The Chattanooga Medicine Company, Chattanooga, Tenn., a corporation of Tennessee No Drawing. Application August 13, 1954, Serial No. 449,793

5 Claims. (Cl. 260—256)

This invention relates to the water soluble salts of 8-(para-aminobenzyl) caffeine and to a method for their preparation.

It has heretofore been proposed that 8-benzyl caffeine might be a potent hypotensive agent in the control or relief of hypertension, but pharmacologic tests and clinical studies have not borne out that hope. I have now found, however, that water soluble salts of 8-(para-aminobenzyl) caffeine, and particularly the hydrochloric acid salt, are very potent hypotensive agents. They further have the very great advantage of being water soluble, whereas the free amino base derivatives are not, and therefore are capable of being administered perorally.

It is therefore an important object of this invention to provide novel water soluble salts of 8-(para-aminobenzyl) caffeine, which have unexpected potency as hypotensive agents.

It is a further important object of this invention to provide 8-(para-aminobenzyl) caffeine hydrochloride, which is readily soluble in water to form stable solutions that can be administered perorally in the relief of high blood pressure.

It is a further important object of this invention to provide a novel method for the preparation of water soluble salts of 8-(para-aminobenzyl) caffeine, and particularly 8-(para-aminobenzyl) caffeine hydrochloride.

Other and further important objects of this invention will become apparent from the following description and appended claims.

The compounds to which this invention relates are the water soluble salts of 8-(para-aminobenzyl) caffeine, wherein the amino group has been reacted with an acid, which may be either organic or inorganic, and monobasic or poly-basic. Examples of such acids are hydrochloric, sulfuric, phosphoric, nitric, tartaric, citric, and the like. Where a poly-basic acid is used, an acid salt of the acid used may be formed.

Since 8-(para-aminobenzyl) caffeine hydrochloride is the preferred water soluble salt, its preferred method of preparation will be given in the following example. The other salts may be similarly formed, using corresponding molecular proportions.

EXAMPLE

The following process is preferred because it eliminates any possible methylation of the aromatic amino group in the synthesis of 8-(para-aminobenzyl) caffeine by methylation of 8-(para-aminobenzyl) theophylline. The latter compound may be prepared, for example, by the method described in an article by the present applicant and others appearing in the Journal of the American Pharmaceutical Association, Scientific Edition, volume XLIII, No. 3, of March 1954, pages 152 to 155. The reactions involved are broadly the following:

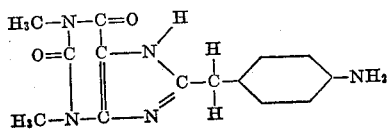

8-(para-aminobenzyl) theophylline (I)

(1) HCl—H₂O
(2) (CH₃CO)₂O
(3) CH₃COONa

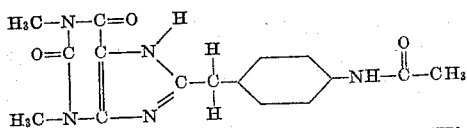

8-(para-acetylaminobenzyl) theophylline (II)

(1) NaOH
(2) (CH₃)₂SO₄

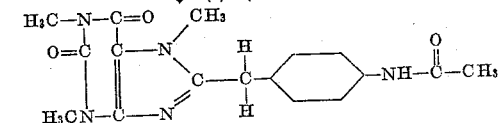

8-(para-acetylaminobenzyl) caffeine (III)

HCl—H₂O
Δ

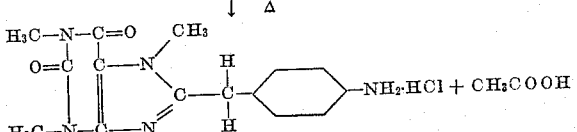

8-(para-aminobenzyl) caffeine hydrochloride (IV)

Procedure 855 grams of purified 8-(para-aminobenzyl) theophylline (I) (3 mols) were suspended in 7500 ml. of water and sufficient concentrated hydrochloric acid was added with constant stirring until all of the theophylline compound had dissolved (255 ml. of HCl being required). 306 grams of acetic anhydride were then added in one portion to the well stirred solution. Immediately thereafter, a solution of 246 grams (3 mols) of anhydrous sodium acetate (or its equivalent of the hydrated sodium acetate) dissolved in 1500 ml. of water was added quickly to the well stirred solution. 8-(para-acetylaminobenzyl) theophylline (II) separated out almost immediately and the mixture could be stirred only with difficulty. After one hour of additional stirring, the mixture was filtered and the cake of (II) was washed well with cold water until most of the free acid had been removed. Any unreacted 8-(para-aminobenzyl) theophylline goes out with the wash water as the soluble hydrochloride. The cake (II) was pressed as dry as possible on a filter funnel.

The acetylated derivative (II) was suspended in 10,000 ml. of water and sodium hydroxide solution (600 cc. of 40% NaOH being suitably used) was added with constant stirring until all of the compound (II) had dissolved and the solution was strongly alkaline. 378 grams (3 mols) of dimethyl sulfate were then added with vigorous stirring over a period of thirty minutes. A few minutes after starting the addition of the methyl sulfate, a finely divided white precipitate of 8-(para-acetylaminobenzyl) caffeine began to separate. An additional 100 ml. of dimethyl sulfate were added to insure complete methylation of the theophylline compound (II). The suspension was then allowed to stand over night and filtered, the filter cake washed well with cold water (3 to 4 liters) and pressed as dry as possible on the filter funnel. The cake (III) weighed 2554 grams (wet weight).

The 8-(para-acetylaminobenzyl) caffeine (III) was deacetylated by suspending it in a mixture of 4000 ml. of water and 1000 ml. of concentrated hydrochloric acid contained in a 12 l. flask fitted with a reflux condenser, heating to the boiling and cautiously adding more concentrated hydrochloric acid in 100 ml. portions until the acetylated derivative (III) began to dissolve. In all, 500 additional ml. of HCl were required, making a total used of 1500 ml. As the compound (III) began to deacetylate, it went into solution rapidly to form a clear, coffee-colored solution. This solution contained 8-(para-aminobenzyl) caffeine as the hydrochloride salt (IV). The solution was boiled for an additional fifteen minutes after clearing in order to insure complete reaction, and then allowed to stand over night. The next morning, the solution was heated to boiling, treated with a decolorizing carbon (Norite), filtered, the pale yellow filtrate allowed to cool and then made alkaline by the addition of sodium hydroxide solution with stirring. The free caffeine base (not the hydrochloride) precipitated from the solution as a tannish colored solid, some being in the form of lumps and other portions in the form of fine crystals. The hot mixture (due to the generation of considerable heat by the addition of the NaOH solution) was cooled thoroughly before filtering. More of the free base crystallized out on cooling. The mixture was filtered and the cake of the free base washed with cold water pressed as dry as possible. The yield of dry caffeine base was 695 grams, having a melting point 210 to 213° C. for the thus obtained crude product, and 220 to 222° C. melting point for the purer product.

The caffeine base was converted into the hydrochloride (IV) by suspending in water, using approximately 10 ml. of water for each gram of the base (III) and adding concentrated hydrochloric acid to the warmed and stirred mixture until all of the solids dissolved. The light-brown solution was then boiled and treated with a decolorizing carbon, filtered, and cooled in ice water until crystals separated. The resulting 8-(para-aminobenzyl) caffeine hydrochloride (IV) separated as tiny, colorless crystals, having a melting range of 232–240° C., depending upon its purity. By concentrating the mother liquors from each crystallization, more of the compound could be obtained. Some off-colored (faintly pink) product thereby obtained was redissolved in hot water, treated with decolorizing carbon, filtered and the filtrate cooled. The total yield was 606 grams of pure, colorless product and an additional 50 grams of off-colored product.

In the above method, the methylation step can be carried out by the use of diazomethane, methyl chloride and alkali, or dimethyl sulfate, or by any of the usual methylating agents. Deacetylation can be similarly carried out by the use of strong acids other than hydrochloric, with or without the addition of heat.

The free 8-(para-aminobenzyl) caffeine base can be converted to any of the other water soluble salts by suspending in water, adding the particular acid selected for the salt which is desired, and heating to dissolve, followed by cooling to effect separation of crystals of the desired water soluble salt. Decolorization and purification can be carried out as above described in connection with the hydrochloride salt.

In the case of the stronger inorganic acids, the 8-(para-aminobenzyl) caffeine forms true salts having relatively sharp melting points and containing percentages of the combined acid close to theory. This is borne out by the determinations made and embodied in the following table:

The hydrochloride—M. pt. 239–240° C.:
Neutral equivalent—335 (theory 335.5)
Per cent HCl—10.88%, corresponding to 8-p-A. B. C.·1HCl The phosphate M. pt. 255° C.:
Neutral equivalent—207 (theory 397)
Per cent $H_3PO_4$—21.4%, corresponding to 8-p-A. B. C.·1$H_3PO_4$ The sulfate—M. pt. 218° C.
Neutral equivalent—352 (theory 348)
Per cent $H_2SO_4$—13.86%, corresponding to 8-p-A. B. C.·½$H_2SO_4$ The hydrobromide—M. pt. 260–261° C.:
Neutral equivalent—398 (theory 380)
Per cent HBr—20.28%, corresponding to 8-p-A. B. C.·1HBr With organic acids, the 8(para-aminobenzyl) caffeine forms complexes that dissolve readily in water to form solutions from which white crystalline solids separate upon cooling or upon the addition of alcohol to the concentrated solution, but these crystalline precipitates vary in composition (as indicated by neutral equivalent determinations) and in many cases values for definite salts (i. e. p.-A. B. C.·¼, ½, ¾, 1, 2, 3 etc. HX) cannot be calculated from such neutral equivalent determinations. It is believed, therefore, that the caffeine derivative exists in solution as a "complex" with the particular organic acid added thereto. Nevertheless the white solids obtained by precipitation of the organic acid complexes are readily soluble in water. The succinate, tartrate, citrate and nicotinate are typical of such organic acid complexes.

Because it is possible to produce true salts from the stronger inorganic acids, they are preferred to the organic acids for preparing the water salts of 8-(para-aminobenzyl) caffeine, but water soluble salts or complexes can be produced in either case by reaction with an appropriate excess of the acid. The term "salt" as used herein, is intended to cover both the true salts and also those salts that appear more accurately to be "complexes," but are also truly water soluble. Since the hypotensive activity is due to the 8-(para-aminobenzyl) caffeine part of these salts, all of them are useful for reducing high blood pressure and all have the advantage due to their water solubility of being satisfactory for peroral administration.

Other starting materials may be used and other methods for the preparation of the caffeine base may be employed, but the above described method for its preparation is preferred, since it eliminates the possibility of methylation of the aromatic nitrogen, which is likely to occur when 8-(para-aminobenzyl) theophylline is used as a starting material and one attempts to go directly through the para-aminobenzyl derivative of theophylline and to methylate that to obtain the corresponding caffeine derivative. In the formation of the 8-(para-aminobenzyl) caffeine hydrochloride from the free base, it is preferable to add concentrated hydrochloric acid to the water suspension of the caffeine base, as described in the above example, but the free base in dry form can be dissolved in dilute hydrochloric acid and the resulting solution evaporated to a thick syrup, and the salt precipitated by the addition of alcohol.

I claim as my invention:

1. A water soluble, non-toxic acid salt of 8-(para-aminobenzyl) caffeine.

2. The hydrochloric acid salt of 8-(para-aminobenzyl) caffeine.

3. A compound having the following general structural formula:

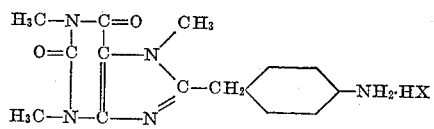

where X is a non-toxic acid radical.

4. The method of making a water soluble salt of 8-(para-aminobenzyl) caffeine, which comprises acetylating 8-(para-aminobenzyl) theophylline to form 8-(para-acetylaminobenzyl) theophylline, methylating the latter compound to produce the corresponding caffeine compound, and reacting said caffeine compound with a selected acid to form a water soluble salt of said caffeine compound with said selected acid.

5. The method of making a water soluble salt of 8-(para-aminobenzyl) caffeine, which comprises reacting 8-(para-aminobenzyl) theophylline with acetic anhydride, salting out the resulting 8-(para-acetylaminobenzyl) theophylline, recovering the latter compound and suspending the same in water, reacting said suspended latter compound with di-methyl sulfate in the presence of an alkali to effect the formation and precipitation of 8-(para-acetylaminobenzyl) caffeine, deacetylating said last mentioned compound to form the corresponding 8-(para-aminobenzyl) caffeine and reacting the same with an acid to form a soluble salt thereof.

References Cited in the file of this patent

Hagar et al.: J. Am. Pharm. Assoc. 43 (No. 3), 152–55 (1954).